United States Patent Office 3,282,953
Patented Nov. 1, 1966

3,282,953
PHTHALAMIDINE COMPOUNDS
Rudolf Hirt, Muri, near Bern, Switzerland, assignor to Dr. A. Wander S.A., Bern, Switzerland, a corporation of Switzerland
No Drawing. Filed Nov. 20, 1962, Ser. No. 239,076
10 Claims. (Cl. 260—309.6)

This invention relates to new polybasic compounds having the general Formula I:

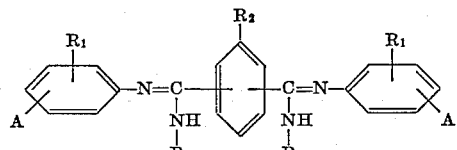
(I)

which can also occur in the tautomeric form

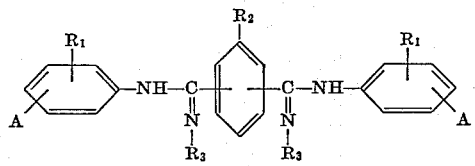

and acid addition salts thereof. In Formula I the symbol A denotes:

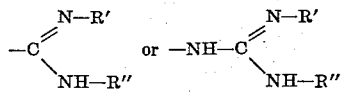

residues and in which residues R' and R" are the same or different and denote hydrogen atoms or straight or branched alkyl, alkenyl, hydroxyalkyl or alkoxyalkyl residues with each carbon containing residue having not more than 5 carbon atoms; or in which R' and R" when taken together represent ethylene or propylene and wherein individual hydrogen atoms thereof can be replaced by alkyl residues which add to said ethylene and propylene a total of less than 5 carbon atoms. $R_1$ denotes a hydrogen or halogen atom or alkyl and alkoxy residues with each residue containing 1 to 3 carbon atoms. $R_2$ represents a hydrogen or halogen atom, a nitro residue or alkyl and alkoxy residues with each carbon containing residue having less than 4 carbon atoms. $R_3$ is a hydrogen atom or an alkyl residue with 1 to 5 carbon atoms.

The said products are obtained by reacting a compound of Formula II:

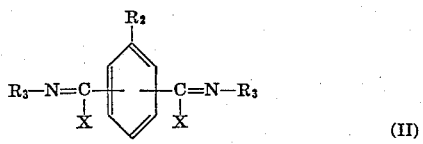
(II)

wherein X represents a radical reactive with amines, or an acid addition salt of this compound, with an amine of Formula III:

(III)

in which compounds the nitrogen substituent $R_3$ from Formula II can be exchanged against the nitrogen substituent

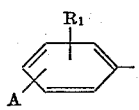

from Formula III. The reactive radical X is, depending upon the further conditions of reaction, preferably a halogen-, especially a chlorine-atom, an alkoxy or alkylmercapto residue, or one of the residues —OSOCl or —OPOCl$_2$ If $R_3$ in Formula II denotes an alkyl residue, or $R_3$ in this formula is exchanged against

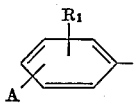

then X is preferably a chlorine atom, an alkoxy or alkylmercapto residue. In this case instead of the free imide chlorides, imido ethers or imido thio ethers, their addition salts with suitable acids, especially the hydrochlorides, can also be used. If $R_3$ in Formula II denotes a hydrogen atom, X is preferably an alkoxy or alkylmercapto residue.

The reaction, for example, of the free imido ether (II; X=alkoxy) with the amine (III) is preferably carried out in a solvent, e.g. dioxane, chloroform or an alcohol, by heating for several hours at reflux temperature. On using the hydrochloride, a hydrogen chloride-binding base, such as pyridine, is suitably added, which can also serve as a solvent. After evaporation of the reaction mixture and dissolution of the residue, the base can be liberated with aqueous alkali hydroxide and if desired converted in a way known per se into a salt. The imido thio ether and the imide chloride are reacted in a similar way.

Compounds according to Formula I can also be obtained by using in the reactions decribed above such starting materials as present in place of the basic radical

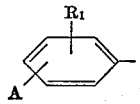

a

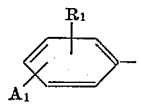

radical, wherein $A_1$ denotes a residue which can be converted into the A residue, and by converting this $A_1$ residue subsequently into A. The $A_1$ residue can, for example, be a cyano, thio amide, imido ether, imido thio ether or imide halide residue, which can be converted in a way known per se into the A residue, for example in the following ways:

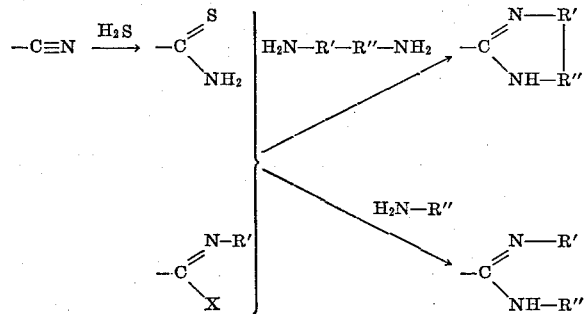

Here X, as above, denotes a reactive radical, especially a halogen atom or an alkoxy or alkylmercapto residue. The reaction of the imide halide, imido ether or imido thio ether with an amine R"—NH$_2$ corresponds with the above-described reaction of the two compounds II and III and is carried out in an analogous manner. Ring closure occurs upon use of a diamine.

The transformation of the nitril into the thioamide is, for example, performed by dissolving the nitril in dimethylformamide and by passing hydrogen sulphide through the solution at room temperature in the presence of a strong base, such as piperidine or triethylamine. After precipitation with water the thioamide is heated, without the addition of solvent, with an excess of the desired amine or diamine, to a temperature of about 110° C.

In so far as in Formula I the radicals R'' and $R_3$ are identical they can also be simultaneously introduced by reacting a starting material of Formula IV:

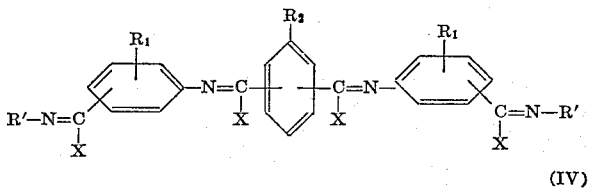

(IV)

wherein X has the meaning mentioned above, with ammonia or with a corresponding monoalkylamine.

The compounds according to Formula I can be obtained as free bases or in the form of their salts with inorganic or organic acids. As salts of the bases according to Formula I, let us mention those of sulphuric, hydrochloric, hydrobromic, hydriodic, phosphoric, formic, acetic, propionic, butyric, tartaric, maleic, oxalic, citric, salicylic acid and the like. The salts of the hydroxycarboxylic, ketocarboxylic and aminocarboxylic acids, and especially the salts of glycolic, lactic, saccharic, mucic, ascorbic, heptagluconic, galactosido-gluconic, galactosido-heptagluconic, laevulinic and glutamic acid, stand out by reason of their particularly good solubility.

The manufacture of soluble salts is suitably carried out by suspending the polybasic compound in water and adding the quantity of the desired acid required for neutralisation, whereupon the base passes into solution. If desired, the salt can be obtained in solid form by evaporating or by adding acetone. The resultant soluble salts yield stable, sterilisable solutions which are suitable for injection. The solutions can also contain other substances, but care should be taken that these are not precipitants.

The polybasic compounds obtained in the way described above, and their therapeutically useful acid addition salts, are new compounds which show biological actions. They have a strong growth-inhibiting action on various bacteria and protozoa, especially trypanosomes. Thus they are suitable as chemotherapeutic agents and they can be used as intermediate products for the manufacture of other, especially pharmacologically active compounds.

For general chemotherapeutic purposes, especially the treatment of trypanosomic infections, other pharmaceutical forms and modes of administration are also suitable. Besides solutions or suspensions, preparations in the form of powder or ointment, containing the usual pharmaceutical carriers and excipients in addition to the active substance, can also be considered for such purposes.

Example 1

11.5 gm. (0.05 mole) of terephthalbis(methylimidechloride) are heated with 23.6 gm. (0.1 mole) of p-(N',N''-dimethylamidino)aniline dihydrochloride in a mixture of 150 ml. of dimethylformamide and 15 ml. of pyridine for 6 hours at 120° C. After cooling the precipitated product is sucked off and washed with ether. The residue is taken up in 100 ml. of water and an excess of soda solution is added to the solution, whereupon the free base is precipitated. By dissolving the free base in ethanol in the presence of a little glacial acetic acid and adding ethereal hydrochloric acid, the tetrahydrochloride is formed which is sucked off, washed with ether and dried in vacuo. There are obtained 15.0 gm. of N',N'''-bis[p-(N',N''-dimethylamidino)phenyl] - N'',N'''' - dimethylterephthalamidine tetrahydrochloride of melting point 325° C. (decomposition).

Example 2

14.7 gm. (0.05 mole) of terephthalbis(imidoethylether)dihydrochloride and 23.4 gm. (0.1 mole) of p-aminophenylimidazoline dihydrochloride are heated in a mixture of 200 ml. of absolute ethanol and 50 ml. of absolute pyridine for 2 hours under reflux. The reaction mixture is evaporated to dryness in vacuo. The residue is taken up in water and an excess of saturated aqueous soda solution is added to the aqueous solution, whereupon the free base is precipitated. This is isolated by filtration and washed with water. By dissolving the base in absolute ethanol and adding ethereal hydrochloric acid to the ethanolic solution, there are obtained 17.0 gm. of N',N'''-bis(p-2-imidazoline-2-ylphenyl)terephthalamidine tetrahydrochloride of melting point 360° C. (decomposition; from 320° C. brown colouration).

Example 3

23.2 gm. (0.05 mole) of N',N''-bis[p-(N',N''-dimethylamidino)phenyl]terephthalimidechloride are added in portions to 500 ml. of a solution of 3.1 gm. of monomethylamine in ethanol. After standing overnight the reaction mixture is evaporated in vacuo. The residue is dissolved in water, the aqueous solution is filtered in order to remove insoluble matter and soda lye is added to the filtrate, whereupon the free base formed is precipitated. This is isolated by filtration, washed and then dissolved in ethanol in the presence of a little glacial acetic acid. The solution is mixed with ethereal hydrochloric acid and the precipitated solid is sucked off, washed with ether, ethanol and again ether, and dried in vacuo. There are obtained 18.5 gm. of N',N'''-bis[p-(N',N''-dimethylamidino)phenyl]-N'',N'''' - dimethylterephthalamidine tetrahydrochloride of melting point 325° C. (decomposition). The product is identical with the compound obtained according to Example 1.

Example 4

Hydrogen sulphide is passed through a solution of 15.8 gm. (0.05 mole) of N',N'''-bis(cyanophenyl)terephthalamidine in a mixture of 80 ml. of dimethylformamide and 10 ml. of piperidine. After standing overnight the reaction mixture is mixed with water and the precipitated product isolated by filtration.

The bis-thioamide obtained in this way is heated with 50 ml. of ethylenediamine for 2 hours at 110° C., sucking off excess ethylenediamine in vacuo. The residue is taken up in 100 ml. of absolute ethanol and ethereal hydrochloric acid is added to the ethanolic solution. There are obtained 9.5 gm. of N',N'''-bis(p-2-imidazoline-2-ylphenyl)terephthalamidine tetrahydrochloride of melting point 360° C. (decomposition). The product is identical with the compound obtained according to Example 2.

Example 5

13.6 gm. (0.025 mole) of N',N'''-bis[p-(N-methylimidechloride)phenyl]-N'',N''''-diethylterephthalamidine dihydrochloride are dissolved in 150 ml. of absolute ethanol, 20 ml. of ethylamine are added to the solution and the mixture is warmed for 4 hours at 60° C. The reaction mixture is evaporated to dryness and the residue dissolved in 50 ml. of glacial acetic acid. By adding alcoholic hydrochloric acid to the resultant solution a precipitate is obtained which is isolated by filtration and washed with ether. There are obtained 6.1 gm. of N',N'''-bis[p-(N'-methyl-N''-ethylamidino)phenyl]-N'',N''''-diethylterephthalamidine tetrahydrochloride of melting point 245° C. (decomposition).

Example 6

25.2 gm. (0.05 mole) of N',N''-bis[p-(N-methylimidechloride)phenyl]terephthalimidechloride are added to 500 ml. of methanol saturated with gaseous ammonia. After standing for 3 days the reaction mixture is evaporated in vacuo. The residue is dissolved warm in diluted acetic acid and the solution filtered. Concentrated soda lye is added to the filtrate, whereupon a solid separates which is isolated by filtration, washed with water and dried in vacuo. The base obtained in this way is dissolved in absolute ethanol. Ethanolic hydrochloric acid is added to the solution, whereupon a solid separates. This is sucked off after adding acetone, washed with acetone and ether and dried in vacuo. There are obtained 12.6 gm. of N',N'''-bis[p-(N'-methylamidino)phenyl]terephthalamidine tetrahydrochloride of melting point 240° C. (decomposition).

*Example 7*

By the same procedure as in Example 6 there are obtained by treating 26.6 gm. (0.05 mole) of N',N''-bis[p-(N-ethylimidechloride)phenyl]terephthalimidechloride with ammoniacal methanol, 17.5 gm. of N',N'''-bis[p-(N'-ethylamidino)phenyl]terephthalamidine tetrahydrochloride of melting point 248° C. (decomposition).

*Example 8*

By the same procedure as in Example 6 there are obtained, by treating 25.2 gm. (0.05 mole) of N',N''-bis[p-(N-methylimidechloride)phenyl]isophthalimidechloride with ammoniacal methanol, 13.8 gm. of N',N'''-bis[p-(N'-methylamidino)phenyl]isophthalamidine tetrahydrochloride of melting point 260° C. (decomposition).

*Example 9*

By the same procedure as in Example 6 there are obtained by treating 28.6 gm. (0.05 mole) of 2-chloro-N',N''-bis[p-(N-methylimidechloride)phenyl]isophthalimidechloride with ammoniacal methanol, 19.6 gm. of 2-chloro-N',N'''-bis[p-(N'-methylamidino)phenyl]isophthalamidine tetrahydrochloride of melting point 268° C. (with frothing).

*Example 10*

By the same procedure as in Example 6 there are obtained, by treating 26.6 gm. (0.05 mole) of N',N''-bis[p-(N-ethylimidechloride)phenyl]isophthalimidechloride with ammoniacal methanol, 11.0 gm. of N',N'''-bis]p-(N'-ethylamidino)phenyl]isophthalamidine tetrahydrochloride of melting point 245° C. (yellow molten mass).

*Example 11*

By the same procedure as in Example 6 there are obtained, by treating 28.6 gm. (0.05 mole) of 2-chloro-N',N''-bis[p-(N-methylimidechloride)phenyl]terephthalimidechloride with ammoniacal methanol, 20.1 gm. of 2-chloro-N',N'''-bis[p-(N'-methylamidino)phenyl]terephthalamidine tetrahydrochloride of melting point 265° C. (decomposition; yellow molten mass).

*Example 12*

25.2 gm. (0.1 mole) of N',N''-bis[p-(N-methylimidechloride)phenyl]terephthalimidechloride are added in portions to 100 ml. of a 33% solution of monoethylamine in ethanol. After letting stand overnight the reaction mixture is evaporated in vacuo. The residue is dissolved in water, the solution filtered and the filtrate mixed with concentrated soda lye. Thereby a solid is precipitated which is isolated by filtration, washed with water and dissolved in absolute ethanol. The solution is mixed with ethanolic hydrochloric acid, filtered and the filtrate is evaporated in vacuo to a syrupy consistency. After adding a little ethanolic hydrochloric acid the whole is allowed to stand, whereupon the tetrahydrochloride slowly separates. After adding acetone the solid is sucked off, washed with ethanol-acetone and dried in vacuo. There are obtained 3.5 gm. of N'N'''-bis[p-(N'-methyl-N''-ethylamidino)phenyl]-N'',N''''-diethylterephthalamidine tetrahydrochloride of melting point 245° C. (de- composition). The product is identical with the compound obtained according to Example 5.

By suitably utilizing the processes described more closely in the above examples there are obtained, for example, the following further compounds according to Formula I:

N',N''''-bis(p-2-imidazoline-2-ylphenyl)-N'',N''''-dimethylterephthalamidine tetrahydrochloride;
N',N''''-bis(p-2-imidazoline-2-ylphenyl)isophthalamidine tetrahydrochloride;
N',N''''-bis[p-(N'-ethylamidino)phenyl]-N'',N''''-diethylterephthalamidine tetrahydrochloride;
N',N''''-bis[p-(N'-ethylamidino)phenyl]-N'',N''''-di-n-butylterephthalamidine tetrahydrochloride;
N',N''''-bis[3-chloro-4-(2-imidazoline-2-yl)phenyl]-N'',N''''-dimethylterephthalamidine tetrahydrochloride;
N',N''''-bis[3-methyl-4-(2-imidazoline-2-yl)phenyl]-N'',N''''-dimethylterephthalamidine tetrahydrochloride;
N',N''''-bis[3-methoxy-4-(2-imidazoline-2-yl)phenyl]-N'',N''''-dimethylterephthalamidine tetrahydrochloride;
N',N''''-bis[p-(N',N''-dimethylguanidino)phenyl]-N'',N''''-dimethylterephthalamidine tetrahydrochloride;
N',N''''-bis[p-(1,4,5,6-tetrahydro-2-pyrimidinyl)phenyl]-N'',N''''-dimethylterephthalamidine tetrahydrochloride;
N',N''''-bis[p-(4-methyl-2-imidazoline-2-yl)phenyl]-N'',N''''-dimethylterephthalamidine tetrahydrochloride;
N',N''''-bis[p-(N'-n-butylamidino)phenyl]-N'',N''''-dimethylterephthalamidine tetrahydrochloride;
N',N''''-bis[p-(N'-methoxy-n-propyl-N''-methylamidino)phenyl]-N'',N''''-dimethylterephthalamidine tetrahydrochloride;
N',N''''-bis(m-2-imidazoline-2-ylphenyl)-N'',N''''-dimethylterephthalamidine tetrahydrochloride;
N',N''''-bis[m-(N'-n-propylamidino)phenyl]-N'',N''''-dimethylterephthalamidine tetrahydrochloride;
N',N''''-bis(p-2-imidazoline-2-ylphenyl)-N'',N''''-dimethylisophthalamidine tetrahydrochloride;
2-chloro-N'-N'''-bis(p-2-imidazoline-2-ylphenyl)-N'',N''''-dimethylterephthalamidine tetrahydrochloride;
2-nitro-N',N'''-bis(p-2-imidazoline-2-ylphenyl)-N'',N''''-dimethylterephthalamidine tetrahydrochloride;
3-methyl-N',N'''-bis(m-2-imidazoline-2-ylphenyl)-N'',N''''-dimethylisophthalamidine tetrahydrochloride;
N',N''''-bis[p-(N'-n-pentyl-N''-methylamidino)phenyl]-N'',N''''-dimethylterephthalamidine tetrahydrochloride;
N',N''''-bis[p-(N'-methylamidino)phenyl]-N'',N''''-di-n-propylterephthalamidine tetrahydrochloride;
N',N''''-bis[p-(N'-N''-dimethylamidino)phenyl]terephthalamidine tetrahydrochloride;
N',N''''-bis[p-(1,4,5,6-tetrahydro-2-pyrimidinyl)phenyl]terephthalamidine tetrahydrochloride;
N'N'''-bis[p-(N',N''-diethylamidino)phenyl]terephthalamidine tetrahydrochloride.

I claim:

1. A member of the group consisting of a polybasic compound of the Formula I:

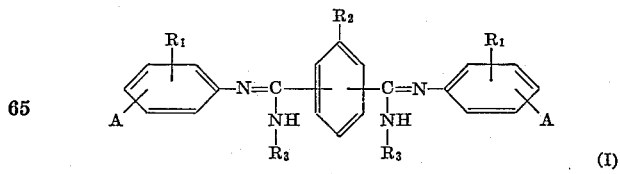

(I)

wherein A denotes a member of the group consisting of

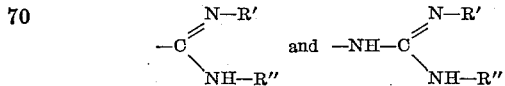

and wherein, R' and R'' representing, interchangeably, members of the group consisting of hydrogen, alkyl, alkenyl, hydroxyalkyl and alkoxyalkyl with each carbon containing group having not more than 5 carbon atoms, and when R' and R" are taken together, ethylene, propylene, and ethylene and propylene wherein at least one hydrogen atom thereof is replaced by lower alkyl and thereby adding a total of less than 5 carbon atoms to said ethylene and propylene; $R_1$ denotes a member of the group consisting of hydrogen, halogen, lower alkyl and lower alkoxy; $R_2$ denotes a member of the group consisting of hydrogen, halogen, nitro, lower alkyl and lower alkoxy; and $R_3$ denotes a member of the group consisting of hydrogen and alkyl with 1 to 5 carbon atoms; and therapeutically useful acid addition salts thereof.

2. N',N'''-bis[p-(N',N''-dimethylamidino)phenyl]-N'',N'''-dimethylterephthalamidine.

3. N',N'''-bis(p-2-imidazoline-2-ylphenyl)terephthalamidine.

4. N',N'''-bis[p-(N'-methyl-N''-ethylamidino)phenyl]-N'',N'''-dimethylterephthalamidine.

5. N',N'''-bis[p-(N'-methylamidino)phenyl]terephthalamidine.

6. N',N'''-bis[p-(N'-ethylamidino)phenyl]terephthalamidine.

7. N',N'''-bis[p-(N'-methylamidino)phenyl]isophthalamidine.

8. 2-chloro-N',N'''-bis[p-(N'-methylamidino)phenyl]isophthalamidine.

9. N',N'''-bis[p-(N'-ethylamidino)phenyl]isophthalamidine.

10. 2-chloro-N',N'''-bis[p-(N'-methylamidino)phenyl]terephthalamidine.

References Cited by the Examiner
UNITED STATES PATENTS

| | | | |
|---|---|---|---|
| 2,196,447 | 4/1940 | Van Peski | 260—564 |
| 2,364,075 | 12/1944 | Hunt et al. | 260—564 |
| 3,018,289 | 1/1962 | Behun | 260—564 |

FOREIGN PATENTS 626,642  8/1961  Canada.

OTHER REFERENCES

Bredereck, Chem. Berichte, vol. 94, pp. 2278–80 and 2286–88 (August 1961).

Burger, Medicinal Chemistry, second ed., pp. 77–78, New York, Interscience, 1960.

Hirt Experientia, vol. 17, pp. 418–20 (Sept. 15, 1961).

WALTER A. MODANCE, *Primary Examiner.*

NICHOLAS RIZZO, *Examiner.*

NATALIE TROUSOF, *Assistant Examiner.*